H. H. STYLL.
OPHTHALMIC LENS.
APPLICATION FILED JUNE 23, 1919.
1,356,666. Patented Oct. 26, 1920.
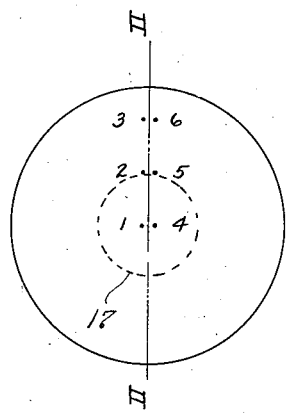
FIG. I
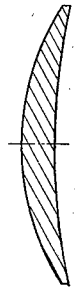
FIG. II
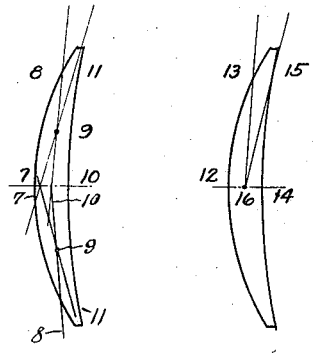
FIG. III    FIG. IV
INVENTOR
H. H. STYLL
BY
H. H. Styll   H. H. Parsons
ATTORNEYS

UNITED STATES PATENT OFFICE.

HARRY H. STYLL, OF SOUTHBRIDGE, MASSACHUSETTS.

OPHTHALMIC LENS.

1,356,666.

Specification of Letters Patent.  Patented Oct. 26, 1920.

Application filed June 23, 1919. Serial No. 306,117.

*To all whom it may concern:*

Be it known that I, HARRY H. STYLL, a citizen of the United States, residing at Southbridge, in the county of Worcester and State of Massachusetts, have invented certain new and useful Improvements in Ophthalmic Lenses, of which the following is a specification.

This invention relates to ophthalmic lenses corrected to give substantially correct vision as regards both focus and astigmatism throughout the entire normal field of vision.

The principal object of this invention is to provide means to relate the opposite faces of the lens in such a way as to produce a minimum variation from the correct powers of focus and astigmatism of the lens at any one position within the normal field of vision.

Another object of this invention is to provide a way to reduce a large variation from the desired powers at any point or points within the normal field of vision by introducing or adding permissible errors at some other point or points within the normal field of vision so that the variations at all points within the normal field of vision will fall within a permissible amount, that is to say, to produce a lens that while it may not be absolutely correct at any point, yet as a whole shall have no variations from correct powers that do not fall within a permissable amount.

Other objects and advantages of the invention will be readily apparent by reference to the following specification taken in connection with the accompanying drawings, and it will be understood that I may make any modifications in the specific details of construction or steps shown and described within the scope of the appended claims without departing from or exceeding the spirit of my invention, the preferred form only having been shown and described for sake of illustration.

To facilitate an understanding of the features hereinafter referred to, I have appended a sheet of drawings illustrative of the same. Similar references throughout the specifications and drawings refer to similar parts.

Figure I represents a face or front view of an ophthalmic lens.

Fig. II represents a sectional view on line II—II of Fig. I.

Fig. III represents a diagrammatic sectional view on the line II—II of Fig. I.

Fig. IV also represents a diagrammatic sectional view on line II—II of Fig. I.

The normal angle of human vision is about sixty degrees. The usual marginal errors or aberrations encountered in ophthalmic lenses are those of focus or spherical power, and those of astigmatism or cylindrical power, and these aberrations cause errors in both magnification and in displacement of the image of the object.

Lenses hitherto have been corrected in the marginal portions both for spherical and cylindrical aberrations, but in all such lenses the calculations have been made for a lens of correct central or vertex power; that is to say, the center was made to the desired power and the errors were corrected from this point out to the margin of the lens, therefore being increasingly greater as they receded from the center toward the edge of the lens. This is best illustrated in Fig. IV, where it will be noted the angle 16—13—15 diverges from the central point 16.

In this invention the central or vertex point is not held as a fixture; in fact there is no fixed point in the lens, but on the other hand the calculations are based on a point in the form of a zone or line somewhere within the normal field of vision about the geometrical center of the lens that will produce the smallest variations possible at all points within the field. In fact errors may be introduced at points of no error, or small error, to aid in reducing down or averaging up greater errors at other points, so that at no point will the errors be greater than an amount permissible to vision.

The old art lenses were correct at one point and departed as little as possible therefrom at other points, but in this invention the idea is to get an average lens that may not be absolutely correct at any one point, yet as a whole gives better results because at no point is the error great enough to be injurious to vision.

This is best shown by referring to the drawings. In Fig. I are shown central, intermediate and marginal powers of focus and astigmatism. 1 indicates the central power of focus; 2 the intermediate power of focus; 3 the marginal power of focus; 4 the central astigmatism; 5 the intermediate astigmatism, and 6 the marginal astigmatism. It will be seen that here we have six elements or powers we may adjust and position to give the nearest approach to the desired powers. By taking some intermediate position, such as 9 in Fig. III, we can proceed both ways in our adjustments instead of only one way, as in Fig. IV. From 9 we can adjust toward both the margin and the center until we arrive at a position where the average departure is a minimum for every point in the field of vision, whereas in Fig. IV we can only proceed from the center 16 toward the marginal points 13 and 15, giving a much wider divergence at the margin than would be obtained in Fig. III, working to both sides of an intermediate point. The divergence of the angles 9—7—10 and 9—8—11, Fig. III, is considerably less than that of the angle 16—13—15 of Fig. IV, as the distance 16—13 is practically double that of the distance 8—9 or 9—10.

In selecting the intermediate point 9 which is used for illustration, it being understood that the points 9 extend in a zone, the circumscribing line extending about the optical center of the lens as indicated by the dotted line 17 in Fig. I, it may be found that the desired power may be retained at this point with permissible variations both at the center and the edge of the lens, or it may be found that to reduce the variations at the center or at the edge within permissible limits a variation will have to be introduced at the points 9, but of course the variation thus introduced will be kept below the permissible amount. Having six elements which may be varied adjustments with these may be made whereby an average lens of the lowest possible variation can be produced. No one of all the six elements is to be considered as fixed but they are to be left free to enter the resultant equation of minimum variation of the visual field as a whole.

The processes of making these lenses are the usual processes of making ordinary commercial ophthalmic lenses, and the calculations are made in the same way, only using the intermediate line 17, Fig. I as a basis, instead of the central point 16, Fig. IV as has hitherto been done.

The lenses also can be made individually to a prescription, each face being calculated for the particular prescription, or they may be made in series, wherein one face for several powers of lenses is a constant, and the other side a variable. When made in series blanks ground on the constant side may be sold to the dealer, and the dealer can put the second side on to get the required prescription.

When ground in series the power of the face curves is suitably marked on the lens or container, and a chart is furnished the dealer showing the curve of the second side to give the required prescription. Tools also for grinding the second side are prepared and sold to the dealer. Each tool is numbered and marked to indicate the curve of its face. These tools are the ordinary lap tools. The charts show the constant curves, the variable curves, and the tool numbers.

This lens when produced in the series method can be supplied the patient as quickly and practically and as cheaply as the old commercial uncorrected ones.

The amount of permissible variation may be fixed at any desired predetermined standard satisfactory to the oculist. The one usually used, however, is that amount by which ophthalmic lenses vary from each other in the commercial series. At some portions of the range this is one-eighth of a diopter; at others a quarter, and so on, even up to one whole diopter in very strong curves, gradually increasing from the weak to the stronger curves. The amount, therefore, most practicable to select would be that by which corresponding ophthalmic lenses vary from each other in their corresponding section of the ophthalmic range of powers.

I claim:

1. An ophthalmic lens whose opposite faces are adjusted about a line intermediate its center and margin to reduce the average departure from desired power throughout the lens to a minimum.

2. An ophthalmic lens whose opposite faces are related to each other about an intermediate power between the central and marginal powers, said power departing from the desired power of the lens by less than a predetermined amount and allowing a departure from the desired power at the central and marginal portions of less than said amount.

3. An ophthalmic lens whose opposite faces are related about a line intermediate the center and edge having a power which departs from the desired power by less than corresponding ophthalmic lenses vary from each other in the ophthalmic series, and producing a departure throughout the normal field of vision of less than said amount.

In testimony whereof I have affixed my signature, in presence of two witnesses.

HARRY H. STYLL.

Witnesses:
H. K. PARSONS,
H. E. COLEMAN.